Patented Oct. 20, 1953

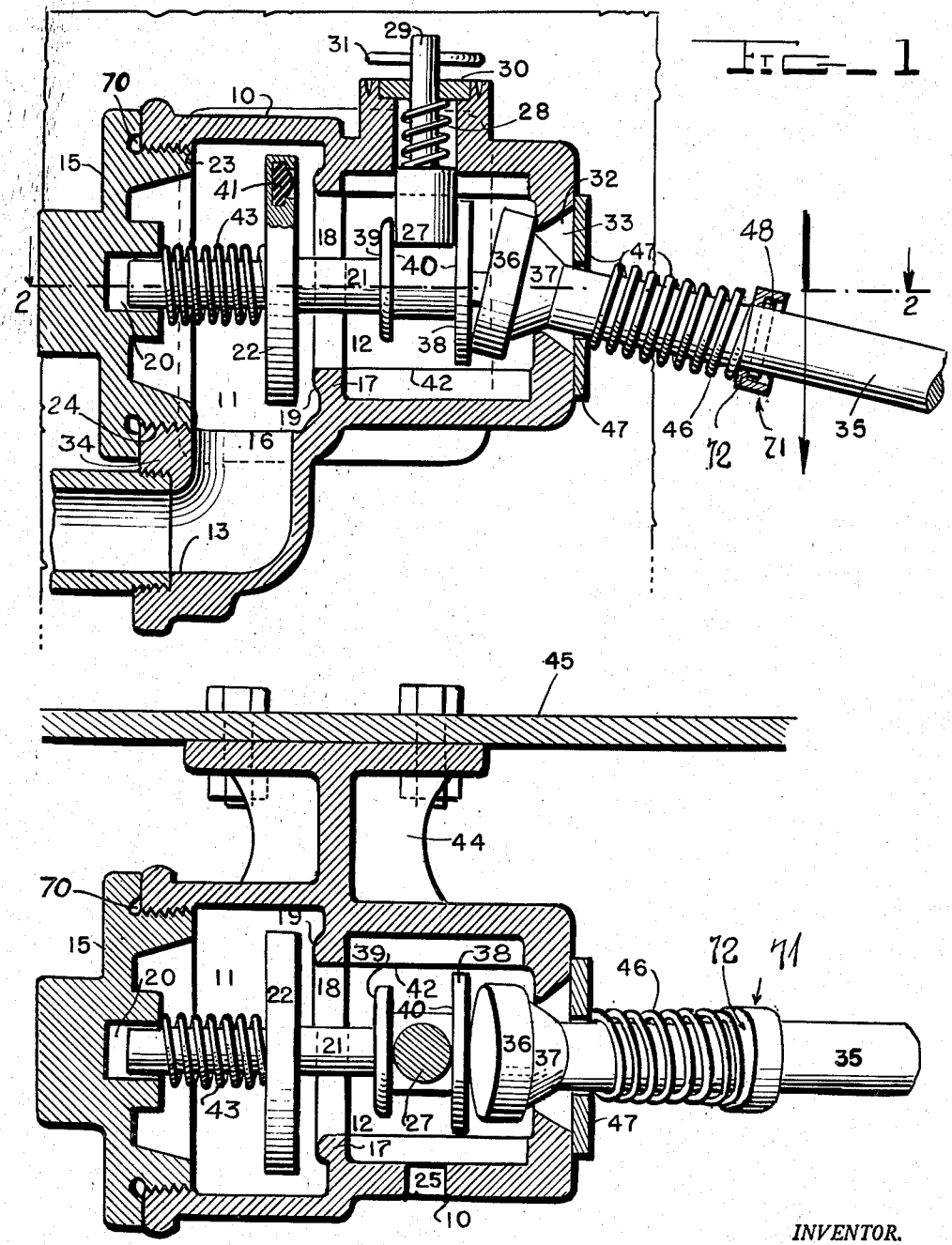

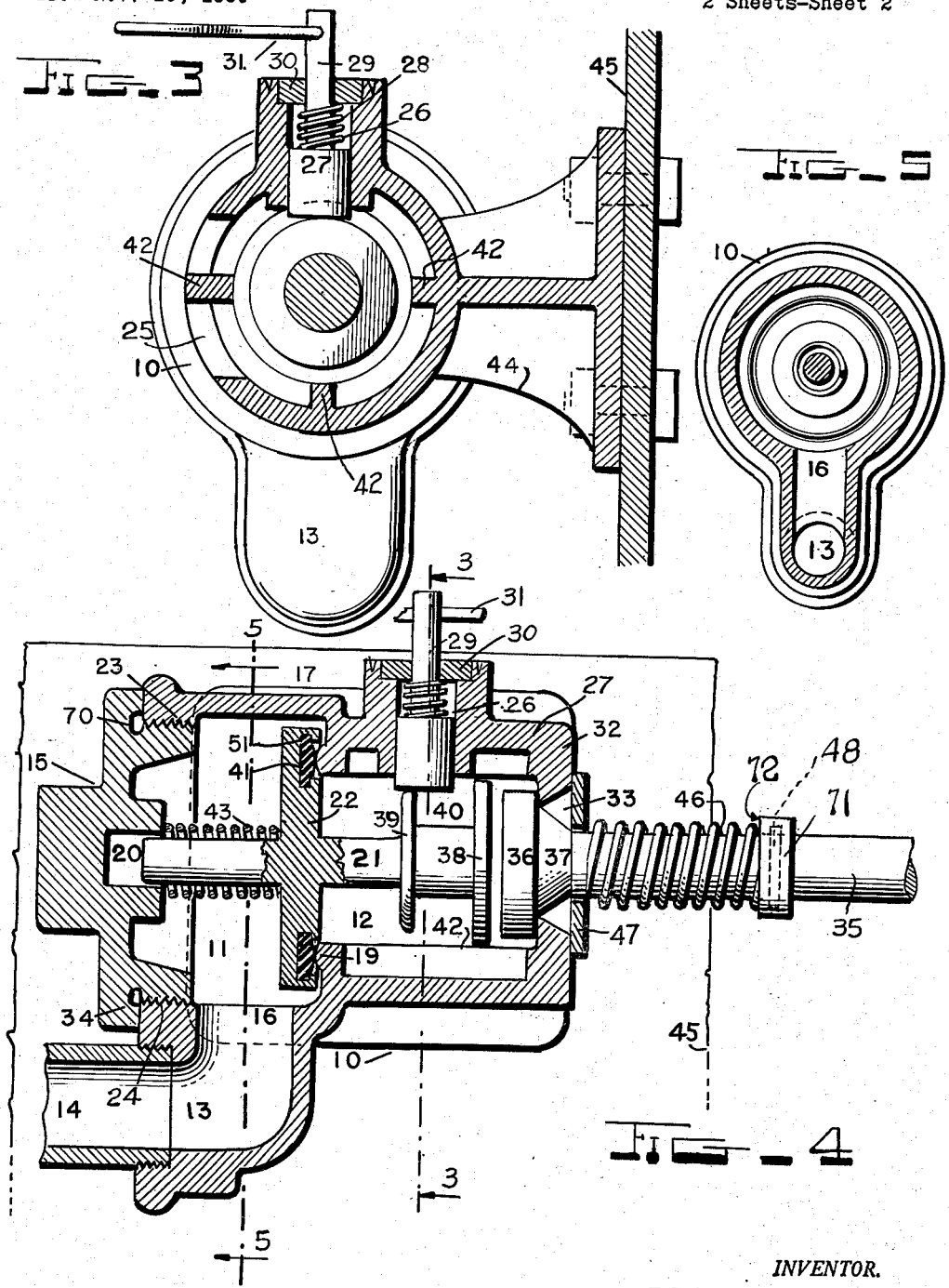

2,656,145

UNITED STATES PATENT OFFICE 2,656,145

EMERGENCY ACTING CONTROL UNIT FOR FLUID BRAKES

Frans O. Lawson, Greensboro, N. C.

Application November 10, 1950, Serial No. 195,098

1 Claim. (Cl. 251—134)

This invention relates to railway equipment and more particularly to an emergency acting control unit for air brakes. The purpose of this control unit is to furnish an additional safety device for the operating of the air brake system in case the railroad car should be dislodged from the tracks or derailed, and such similar conditions, where the car may be involved in an accident that induces it to be turned over or otherwise rendered dangerous or out of commission to a substantial degree. It is an improvement made by the present applicant in U. S. Patent No. 947,142 and others in the same class. In the present invention, the structure preferred is more positively operated and includes elements so positioned that they will open the valve of the air or fluid brake system to its emergency status when needed and will remain in that position until the entire emergency situation is ameliorated.

The invention includes among its objects, to provide a new and improved control unit for emergency control of a fluid brake system that will avoid some of the disadvantages and limitations of the prior art.

Another object of this invention is to provide a new and improved emergency acting control system for fluid brakes that will operate positively and effectively and hold that position it may be operably placed in.

An additional object of this invention is to provide an emergency acting device for the operation of a fluid brake system that will be compact, simple in construction, easy to operate when the emergency arises, and access to some of its operating parts from the outside.

A further object of the invention is to provide a mechanical control unit for the emergency activation of the brake system on a railroad car or the like, in an automatic manner when the occasion arises.

Still another object of this invention is to provide a new and improved emergency control unit for brake systems, that will include a number of particular refinements of especial practical value, such as to provide adjustments for the installation of the unit in the locations selected; arrangements for preventing the gaskets from being lost through the action of the air system, a ring pull for the latch that will be easier to handle and less likely to lose, access to parts, an arrangement for dismantling the housing and bracket components and a compact valve mechanism and housing.

Other objects of the invention will be evident as it is more fully outlined.

For a better understanding of the invention, its objects, principles and the operation thereof, reference is made to the accompanying drawings. The drawings in conjunction with the following description portray a particular form of the invention by way of example, not of limitations, while the claims emphasize the scope of the invention.

Referring to the drawings:

Figure 1 is a sectional plan view through the unit while in the emergency operating position and causing the brake system to cooperate;

Figure 2 is a longitudinal sectional view taken along as seen on the line 2—2 of Figure 1;

Figure 3 is a sectional view taken along line 3—3 of Figure 4;

Figure 4 is a sectional view similar to Figure 1, but with the unit in ready-to-operate position;

Figure 5 is a sectional elevation taken along line 5—5 of Figure 8.

Similar reference characters refer to the same parts throughout the drawings.

The construction of the device is in the form of an air-brake control system for railroad cars and is shown in conjunction with such; it is an assembly of components forming a unit adapted to operate the air brake system in an emergency. The main housing 10 consists of a casting of uneven circular form that includes two chambers 11 and 12 interiorly arranged for air passing and valve mechanism and actuator operation respectively. The chamber 11 forming an air passage has an elbow connection 13 for attachment to the air train piping system, in a conventional manner. This chamber 11 is closed by a screw cap 15, in its wall 34 at its free end to allow inspection, cleaning and maintenance and insertion of parts in regular routine. The passage 16 therein leads to the interior of the elbow 13 from the chamber 11 for the flow or escape of air, when the unit is operated for emergency purposes. It is, of course, understood that the function of the unit is to open up the air brake system of a train piping so the brakes will be applied on the railroad car wheels in the usual manner. To do this, the housing is used for an escape or flow for this air of the system. The inner end of the chamber 11, has a wall 17, with a large circular opening 18, through it, the peripheral portion around this opening being arranged as a valve seat 19. The cap 15, is made like a common pipe plug but has in addition a central recess 20 that serves as a guide and support for one end of the stem 21 of the valve head 22. The cap 15 is of course, adjustable by screwing its threads in the threads 23 of the opening 24, provided in its free end wall 34 for the purpose. The annular groove 70 at the termination of the threads reduces leakage.

The inner chamber 12, is preferably smaller than chamber 11, and has its peripheral wall formed with circumferentially spaced longitudinal ribs 42 along its inside surface, between which are two orifices 25 through which the flowing air passes from the train piping system, through the chambers 11, 12, and the opening 18, to them. This chamber 12 has another cylindrical opening and passage 26 in the wall wherein a plunger or latch pull 27 reciprocates. It is pressed inwardly by a coil spring 28 acting on it. It also has a handle 29 extending from it to the outside of the housing and provided with an 8-formed finger ring 31, for its manipulation. A cover 30 closes the outer end of the passage 26 and serves as a reaction surface for the spring 28 on one side and as a limit plate for the ring 31 to press against when the handle is pulled in by the spring. The outer end of the chamber 12 is partly closed in by a wall 32 which has a central circular tapered-in and bell-shaped hole 33 arranged therein. The hole 33 serves as a kind of universal joint for the actuator bar 35 extending through it. An enlarged head consisting of a circular plate 36 larger in diameter than the hole 33, and a frusto conical shoulder 37 is formed at the inner end of the bar 35 and operates within the chamber 12. It can twist and tilt in practically every direction, and when tilted by the bar 35 in an angular position has one side portion resting against one side portion of the inside rim of the hole 33 while the opposite side portion is brought angularly against a large flat circular disc 38 on the inside end of the stem 21, which is axially aligned with the hole 33. The ribs 42 keep the disc 38 from tilting. The plunger 27 fits between this disc 38 and a circular collar 39 also on the stem but spaced from the disc towards the valve head 22. This portion 40 of the stem between the collar and disc has a larger diameter than the rest, to limit the inward travel of the plunger 27. Normally the latch or plunger 27 rests on the peripheral rim of the collar in the position shown in Figure 4, so that when the stem 21 is propelled forward by the head 36 it will slip the plunger or latch pull 27 on to the stem rest 40. The plunger or latch in this position will hold the stem 21, with the valve head 22 in "open" position, so the air can pass over its seat.

The valve head 22 carries a gasket ring disposed in position to contact the seat 19 and prevent leakage by pressure of the coil spring 43 acting between it and the cap. The gasket 41 is mounted in a dovetailed groove 51, so it cannot be sucked out in practice. The housing 10 is provided with a side bracket 44 suitably arranged with bolts for securely fastening it to a convenient portion of a railroad car indicated in general at 45.

The actuator bar 35 is kept under tension against the housing 10 by an encompassing coil spring 46 which acts thereon at a washer 47 held against the housing, and another washer 48 spaced outside from the housing and engaging a cotter pin which passes through the bar. A dowell pin could be used also. However, to prevent loss of either type of pin, it is preferable to enclose it in a cup 71, sprung on the bar 35 and set in a groove 72 to keep it stationary as shown in dotted outline in Figure 1. The length of the actuator bar 35 can be varied to suit the conditions under which it is used and the type of railroad car, locomotive or other railroad vehicle involved. In normal practice the actuator bar protrudes approximately the same length as that of the housing.

The actuating bar 35, is operated through the displacement of an actuator bracket on a bolster or truck of the railroad car, when the latter is derailed or otherwise abnormally jolted out of position.

The manner in which the air is used on the train piping, does not make much difference, that is, whether it is under pressure or vacuumatic, as the unit works with either. It is not necessary that air be employed as it is feasible to use other fluids, where such is desirable. The main item to be considered is that the release of whatever fluid is used through the valve opening operates the brake system involved. The usual method allows the train line pressure to bleed by opening this valve, and upset the equilibrium between the train line and the reservoir storage tank, thereby turning the stored air into the brake cylinder. Its effect is the same as pulling a hose coupling apart.

The valve is in closed position normally with the valve head seated, as shown in Figure 4 and the gasket pressed in between to prevent leaks. The latch pull ordinarily bears against the peripheral edge of the collar 39 neither holding the valve or functioning with it at the moment. When the actuator bar 35 is rocked transversely sufficiently, the valve stem and head being tripped by it, opens and allows the latch pull to be moved inwardly by the spring 28 and hold the valve open by engaging between the collars 38 and 39. This it does until someone pulls the latch ring 31, and moves the latch outwardly to a position in which it allows the valve head to reseat itself.

The bracket frame in all instances has to be located with sufficient spacing between its crosscars and the cut-outs to enable the actuator to play loosely therein and of course has to be substantially built to stand continual jolting and vibrations due to normal running. It will allow all these ordinary oscillations, but when a derailment or drastic physical disturbance takes place between the car body and the trucks, it moves the actuator bar 35 so it opens the valves and places the brakes on. There are various locations where the device may be installed on a vehicle, but usually the selection of only one is necessary, for a single unit will ordinarily handle the situation effectively.

While but one general form of the invention is illustrated, it is not intended to limit the construction of the devices made hereunder to such specific form, as it is apreciated that other structures could be designed and made that could employ the same principles and come within the scope of the appended claim.

Having thus described the invention, what is claimed is:

A valve for a fluid operating brake system including a hollow casing, a valve seat in said casing, said casing having an end wall formed with a centrally located opening, a stem shiftable longitudinally in said casing centrally thereof and carrying a valve disk for resting against the valve seat, a spring yieldably holding the valve disk against said valve seat, a latch movable into and out of position for holding the valve stem and the disk in an open position, and actuating means for moving the valve stem and the disk to an opened position comprising a bar loosely passing through the opening in the said end wall of said casing and being shiftable longitudinally through the opening and tiltable transversely therein, a head at the inner end of said bar of greater diameter than said opening having its inner surface normally in spaced parallel relation to the outer end of said stem and marginal portions of its outer surface abutting the said end wall about the opening therein, an outwardly tapered shoulder extending from said head through said opening, a washer about said bar engaging portions of the outer surface of the end wall about the opening therein, a collar about said bar spaced outwardly from said washer, and a spring about said bar bearing against said washer and said collar and urging the bar outwardly to its normal position.

FRANS O. LAWSON.

References Cited in the file of this patent

UNITED STATES PATENTS

| Number | Name | Date |
| --- | --- | --- |
| 947,142 | Wright | Jan. 18, 1910 |
| 1,115,645 | Wright et al. | Nov. 3, 1914 |
| 1,143,198 | Huntley et al. | June 15, 1915 |
| 1,212,955 | Ingram | Jan. 16, 1917 |
| 1,287,557 | Wright et al. | Dec. 10, 1918 |
| 1,352,861 | Wright et al. | Sept. 14, 1920 |
| 2,121,553 | Stewart et al. | June 21, 1938 |
| 2,288,767 | Young | July 7, 1942 |
| 2,372,081 | Haldane | Mar. 20, 1945 |